United States Patent Office 3,649,494
Patented Mar. 14, 1972

3,649,494
PROCESS FOR THE RADIATION GRAFTING OF 4-VINYL PYRIDINE ONTO POLYESTERS IN THE PRESENCE OF A POLYMERIZABLE UNSATURATED ORGANIC ACID
Ichiro Sakurada, Kyoto-shi, Kyoto-fu, and Toshio Okada, Moriguchi-shi, Osaka-fu, Japan, assignors to Japan Atomic Energy Research Institute, Tokyo, Japan
No Drawing. Filed Sept. 4, 1968, Ser. No. 757,467
Claims priority, application Japan, Sept. 5, 1967, 42/56,561
Int. Cl. B01j 1/00; C08d 9/10
U.S. Cl. 204—159.15       7 Claims

ABSTRACT OF THE DISCLOSURE

Polyester fiber material which can be easily dyed with acidic, basic, direct or dispersed dyes was obtained by graft-copolymerizing 4-vinyl pyridine and a polymerizable unsaturated organic acid onto a polyester fiber material in an aqueous emulsified system by means of ionizing radiation.

BACKGROUND OF THE INVENTION

Hydrophobic synthetic fibers such as polyesters and polyolefins are very difficult to dye. It was proposed and now it is publicly known to endow said synthetic fibers with dyeability by graft-polymerizing onto said fibers polymerizable unsaturated organic acids, polymerizable unsaturated organic bases, etc. having dye affinity.

However, polyester fibers are liable to hydrolyze in the presence of an acid or especially an alkali, and it is difficult to graft-polymerize (graft) a polymerizable unsaturated organic acid or a polymerizable unsaturated organic base thereonto without causing degradation due to hydrolysis of said fiber when said fiber is treated in accordance with the prior art processes.

The polyester fibers onto which 4-vinyl-pyridine has been grafted can be dyed with acidic dyes, which have greater fastness against sunlight and washing. However, in order to acquire satisfactory dyeability by acidic dyes, it is necessary that the degree of graft polymerization be at least 15%, preferably 20% or more.

Further, when 4-vinyl pyridine is singly grafted onto polyester, uneven graft copolymerization will take place, which results in uneven coloring when dyed. Also, if not less than 5% of the 4-vinyl pyridine is grafted, agglutination of filaments, that is, adhesion of filaments occurs. Therefore, there are technical difficulties in this case, and, also, since 4-vinyl pyridine is a rather expensive monomer, economic disadvantages.

Having investigated various factors pertaining to the above-mentioned difficulties, we now have found that the dyeable polyester fiber material which can be dyed satisfactorily by acidic, basic, direct and dispersed dyestuffs and has uniform coloring characteristic can be manufactured by carrying out graft copolymerization onto the polyester fiber material which is contacted with a graft copolymerization medium containing 4-vinyl-pyridine and a minor amount of a polymerizable unsaturated organic acid by means of pre-irradiation or simultaneous irradiation of a high energy ionizing radiation, whereby the pH of said system being kept in the range 6.0–7.5. The graft copolymerization proceeds at a much faster than when 4-vinyl pyridine is singly used in mere polymerization grafting, hydrolysis does not occur because of the controlled pH of the reaction medium or system, and, therefore, agglutination of filaments does not occur, either.

SUMMARY OF THE INVENTION

The copolymerization process of this invention for manufacturing a polyester fiber material easily dyeable with acidic dyes, basic dyes, direct dyes, and dispersed dyes, comprises contacting a polyester fiber material with a mixture the major part of which is 4-vinyl pyridine and the minor part of which is a polymerizable unsaturated organic acid such as acrylic acid in the form of aqueous emulsified medium, and carrying out graft copolymerization by means of irradiation of a high energy ionizing radiation. The graft copolymerization can be carried out by irradiating said material and thereafter contacting said material with said medium, that is, by means of so-clled pre-irradiation.

The process of this invention is applicable to polyester fiber material in the form of fiber, filament, staple fiber, yarn, tow, sliver or fabric.

The polyester fiber material to which the process of this invention can be applied is the commercially available so-called polyester fiber including: not only genuine polyethylene terephthalate, but also copolymer of terephthlate and isophthalate, and blend of terephthalate and isophthalate.

The polymerizable unsaturated organic acid to be graft-copolymerized together with 4-vinyl pyridine in the process of this invention includes: acrylic acid, methacrylic acid, maleic acid, itaconic acid, crotonic acid, propiolic acid, dichloromaleic acid, fumaric acid, etc. and sulfonic acid such as styrenesulfonic acid, ethylenesulfonic acid, etc.

Any of the so-called high energy ionizing radiations is applicable to the process of this invention, from corpuscular radiations such as neutron rays to electromagnetic waves such as gamma radiation and X-rays. It is now well known that these radiations have quite equal effect upon every kind of polymerization reaction. (Refer to: "Atomic Radiations and Polymers" by A. Charlesby, Pergamon Press, England, 1960 if necessary.) Therefore in the process of this invention, any kind of high energy ionizing radiation can be utilized. However, from the practical point of view, electron beams and gamma radiation are most suitable.

The material can be irradiated prior to contacting said material with the materials to be graft-polymerized (pre-irradiated) or irradiation and graft-polymerization can be carried out simultaneously. The dose to be applied varies according to the desired degree of graft polymerization, but usually it is selected from a range $10^3$–$10^7$ roentgens. Irradiation can be carried out either in the presence or in the absence of air.

Selection of species of the ionizing radiation and dose or dose rate to be employed can be easily made by those skilled in the art.

The above-mentioned mixture of 4-vinyl pyridine and the polymerizable unsaturated organic acid is contacted with the polyester fiber material in the form of aqueous emulsion. The weight ratio of 4-vinyl pyridine to a polymerizable unsaturated organic acid is selected so that both components substantially neutralize each other, and the ratio is in the range of 100:5–30 by weight though it varies according to kind and concentration of the acid to be employed. The concentration of the monomer mixture in the emulsion is 2–20%, by weight, preferably 5–10% by weight. For convenience in emulsification, a suitable surfactant is employed. Usually a nonionic or cationic surfactant is used. One example of a suitable surfactant is polyoxyethylene sorbitan monolaurate. The amount of the surfactant to be used is usually 0.1–1.0%. Selection of kind and amount of the surfactant can be easily made by those skilled in the art. The composition of this aqueous emulsion of the monomer mixture (hereinafter called graft copolymerization medium), especially the proportion of the mix of the pyridine and the acid, is determined so as to make the pH of the medium to be in the range of 6.0–7.5. The emulsified state can be maintained by mechanical agitation, too.

The polyester fiber and the graft copolymerization medium is contacted with until the desired degree of graft copolymerization—usually 1–20%—is achieved. The graft copolymerization medium is maintained at temperature in the range of 20–100° C., preferably 50–80° C. for ease in reaction.

The process of this invention has the following advantages when compared with the similar prior art processes. This invention has made it possible to carry out graft copolymerization at a much higher reaction rate without impairing the mechanical properties of the original polyester fiber to be treated, and has technically eliminated the agglutination of filaments which occurs in graft copolymerization of polyester materials as defined above. In the prior art processes at least 15% degree of graft polymerization of 4-vinyl pyridine is necessary in order to secure satisfactory dyeability, whereas, in the process of this invention, only 2% of copolymerization graft is sufficient to improve the affinity of the polyester fibers to not only acidic dyes but also to basic dyes, direct dyes and dispersed dyes.

The polyester fiber materials treated by the process of this invention are dyed with an acidic dye as dark as wool is dyed, a basic or direct dye as dark as cotton, and are dyed with dispersed dye far darker than the original fiber.

In addition to improved dyeability, the polyester fiber materials treated by the process of this invention are superior to the original fiber materials in moisture absorption and antistatic properties.

In the following working examples, the polyester fiber treated in accordance with this invention is subjected extraction treatment prior to graft copolymerization, and thereafter, it is again subjected to extraction for the purpose of removing non-grafted polymers. However, these steps were taken for the purpose of obtaining scientifically precise data, and are not indispensable steps in the practical application of this invention. One advantage of the process of this invention is that there is little or no formation of nongrafted polymers.

The invention of this application makes a great contribution to the techniques for hydrophilization and promotion of dye affinity of polyester fibers.

DETAILED DESCRIPTION OF THE INVENTION

Now the invention is illustrated in detail by way of working examples.

EXAMPLE 1

In 5 cc. of an aqueous emulsified copolymerization medium comprising 10 parts by volume of a mixture of 4-vinyl pyridine and acrylic acid (100:26.3 by weight or 82:18 in molar ratio) and 90 parts by volume of water, containing 0.5 part by weight of polyoxyethylene sorbitan monolaurate (hereinafter simply called emulsifier), the pH of said emulison being adjusted to 6.8; 0.1395 g. of polyethylene terephthalate fiber (5.5 denier x 18 filaments) containing no titanium oxide which had been purified by extraction with carbon tetrachloride at 25–30° C. was immersed in a test tube having the outer diameter of 1 cm.

The tube was sealed after the air in the tube had been evacuated, the reaction system was irradiated with $\gamma$-rays from a cobalt-60 source for 1.5 hours at the dose rate of $1.1 \times 10^4$ roentgens per hour at 50° C. The total dose was $1.7 \times 10^4$ roentgens. The irradiated fiber was extracted with ethanol for 24 hours so as to remove any non-grafted polymers. The weight gain caused by the graft copolymerization was 0.0123 g., that is, a graft-copolymerized polyester fiber having 9.3% graft was obtained.

The obtained fiber was dyed with Brilliant Scarlet 3R, and acidic dye, as dark as wool was dyed with Crystal Violet, a basic dye as dark as cotton; with Congo Red, a direct dye, as dark as cotton; with Kayalon Fast Brown, a dispersed dye very dark in contrast with the original simple polyester fibers, which are dyed with the same dyes to only moderate shade.

By way of comparison, a graft-polymerized polyethylene terephthalate fiber was prepared under the same conditions as above except that no acrylic acid was used. That is to say, the composition of the used polymerization medium was 4 - vinyl - pyridine:water:the emulsifier= 10:90:0.5 by volume (pH=8.8), and the obtained graft-polymerized polyester had 3.0% graft.

This fiber was dyed with the dispersed dye to moderate shade, but was hardly or not dyed with the three other kinds of dyes.

When only 4-vinyl pyridine was used as the monomer to be grafted, and the irradiation was continued no less than 4 hours, a fiber material having as much as 12.3% graft was obtained. This fiber was dyed with the dispersed dye to moderate shade, but it exhibited almost no affinity to the three other-kinds of dye.

Now, it is apparent that use of a minor amount of acrylic acid in combination with 4-vinyl pyridine not only accelerates the polymerization reaction but also imparts better dye affinity to the polyester fiber having a rather low degree of graft copolymerization.

EXAMPLE 2

The same polyethylene terephthalate fiber as used in Example 1 (0.13365 g.) was treated under the same canditions as in Example 1, except that the duration of irridiation was 20 minutes, that is, the total dose was $0.4 \times 10^4$ roentgens.

The weight gain caused by the graft copolymerization was 0.00635 g., which means that a graft-copolymerized polyester fiber material having 4.8 percent graft was obtained. The dyeability of this fiber was tested in the same way as Example 1 and it was revealed that this fiber was dyed evenly and to deep color with all the four kinds of dye.

By way of comparison, with respect to the same fiber sample the graft copolymerization was carried out without using acrylic acid. The other conditions were quite the same as the above (Example 2). However, no weight gain of the sample was recognized.

EXAMPLE 3

The same polyethylene terephthalate fiber as used in Example 1 (0.13316 g.) was subjected to graft copolymerization under the same conditions as in Example 1, except that the composition of the copolymerization medium was 4-vinyl pyridine/acrylic acid (100:26.3 by weight or 82:18 in molar ratio):water:the emulsifer= 20:80:0.5 by volume (pH=7.0), and duration of irradiation was 2 hours ($2.2 \times 10^4$ roentgens).

The weight gain was 0.001185 g., which corresponds to 8.9% graft. This graft polyester fiber was dyed to dark shade with ether of the above-mentioned four kinds of dye.

EXAMPLE 4

The same polyethylene terephthalate fiber as used in Example 1 (0.13154 g.) was immersed in a copolymerization medium comprising 4-vinyl pyridine/acrylic acid (100:26.3 by weight or 82:18 in molar ratio), water and the emulsifier (5:95:0.5 by volume), in a test tube. The tube was sealed after the air had been evacuated, the reaction system was irradiated with $\gamma$-rays from a cobalt-60 source at the dose rate of $1.1 \times 10^4$ roentgents per hour for 2 hours at 50° C. The total dose was $2.2 \times 10^4$ roentgens.

After the non-grafted polymer was removed by extraction, the weight gain was revealed to be 0.01236 g., which corresponds to 9.4% graft. This fiber was dyed dark with either of the above-mentioned four kinds of dye.

EXAMPLE 5

A polyethylene terephthalate fiber containing a small amount of isophthalic acid residue as the copolymer component (0.14255 g.) was immersed in a copolymerization medium comprising 4-vinyl pyridine/acrylic acid (100:26.3 by weight or 82:18 in molar ratio), water and the emulsifier (5:95:0.5 by volume) in a test tube. The tube was sealed after the air had been evacuated, the reaction system was irradiated with $\gamma$-rays from a cobalt-60 source at the dose rate of $1.1 \times 10^4$ roentgens per hour for 2 hours at 50° C. The total dose was $2.2 \times 10^4$ roentgens.

After the non-grafted polymers were removed by extraction, the weight gain was 0.00313 g., which corresponds to 2.2% graft. This fiber was dyed to moderate shade with either of the above-mentioned four kinds of dyes.

EXAMPLE 6

The same graft copolymerization was carried out under the same conditions as in Example 5, except that duration of irradiation was 1 hour, that is, the total dose was $1.1 \times 10^4$ roentgens. A graft copolymer having 1.0% graft was obtained.

This fiber was dyed to almost the same moderate shade as in Example 5 with any of the above-mentioned four kinds of dye.

EXAMPLE 7

Into a copolymerization medium comprising 4-vinyl pyridine/acrylic acid (100:11.6 by weight or 91:9 in molar ratio), water and emulsifier (10:90:0.5) (pH=7.2) was immersed in 0.13755 g. of polyethylene terephthalate fiber (5.5 denier x 400 filaments) containing 0.45% titanium oxide which has undergone extraction treatment with carbon tetrachloride in a test tube.

After the air has been evacuated, the tube was sealed and the reaction system was irradiated with $\gamma$-rays from cobalt-60 at the dose rate of $1.1 \times 10^4$ roentgens per hour for 10 minutes at 50° C. The total dose was $0.2 \times 10^4$ roentgens. After non-grafted polymers were removed, it was revealed that the weight gain of the fiber-material was 0.01646 g., which means that a graft-fiber having 12.0% graft was obtained.

EXAMPLE 8

The same polyethylene terephthalate fiber as used in Example 7 (0.22611 g.) was immersed in the same graft copolymerization medium as in Example 7 and was irradiated with $\gamma$-rays from cobalt-60 source at the dose rate of $1.1 \times 10^4$ roentgens per hour for 6 hours at 50° C. in the presence of air. The total dose was $6.6 \times 10^4$ roentgens.

After the non-grafted polymers were removed by extraction, the weight gain of the sample was 0.01854 g., that is, a graft-copolymerized fiber having 8.2% graft was obtained.

EXAMPLE 9

In the same way as Example 8, 0.23834 g. of the same polyethylene terephthalate fiber was subjected to graft copolymerization in an aqueous emulsified polymerization medium comprising 4-vinyl pyridine/acrylic acid (100:26.3 by weight or 82:12 in molar ratio) water and the emulsifier (10:90:0.5 by volume). In this case, the weight gain of the sample was 0.0871 g., which means that a graft polyester having 4.7% graft was obtained.

EXAMPLE 10

The same polyethylene terephthalate fiber as used in Example 1 (0.2276 g.) was immersed into an aqueous emulsified copolymerization medium comprising 4-vinyl pyridine/acrylic acid (100:11.6 in weight ratio or 91:9 in molar ratio), water and the emulsifier (10:90:0.5 by volume) (pH=7.2), and the reaction system was irradiated with gamma radiation from cobalt-60 in the presence of air at the dose rate of $1.1 \times 10^4$ roentgens per hour for 6 hours at 25° C. The total dose was $6.6 \times 10^4$ roentgens. The weight gain of the sample caused by the graft copolymerization was 0.01826 g., which means that a graft fiber having 8.0% graft was obtained.

EXAMPLE 11

The polyethylene terephthalate as used in Example 1 (0.13650 g.) was irradiated with gamma radiation from cobalt-60 at the dose rate of $9.0 \times 10^4$ roentgens per hour in the presence of air for 24.5 hours at 25° C. The total dose was $2.2 \times 10^6$ roentgens. The irradiated sample was immersed in 5 cc. of an aqueous emulsified copolymerization medium comprising 4-vinyl pyridine/acrylic acid (100:26.3 by weight or 82:18 in molar ratio), water and emulsifier (10:90:0.5), and the reaction system was heated at 50° C. for 75 minutes in the absence of air.

The weight gain of the sample caused by the graft copolymerization was 0.01325 g., that is, a graft-copolymerized fiber having 9.7% graft was obtained.

EXAMPLE 12

The same polyethylene terephthalate as used in Example 1 (0.12465 g.) was irradiated with electron beams of 1.5 mev.–100 $\mu$a. from a Van de Graaf electron accelerator in the presence of air. The total dose was $1.8 \times 10^6$ rad. The irradiated sample was immersed in 5 cc. of an aqueous emulsified copolymerization medium comprising 4-vinyl pyridine/acrylic acid (100:11.6 by weight or 91:9 in molar ratio), water and the emulsifier (10:90:0.5 by volume). The reaction system was heated at 50° C. for 1 hour in the absence of air.

The weight gain of the sample was 0.02294 g., that is, a graft-copolymerized fiber having 18.4% graft was obtained.

EXAMPLE 13

The same polyethylene terephthalate fiber as used in Example 1 (0.1251 g.) was immersed in 5 cc. of an aqueous emulsified medium comprising 4-vinyl pyridine/methacrylic acid (100:11.3 by weight or 93:7 in molar ratio), water and emulsifier (10:90:0.5 by volume), the pH of said medium being 7.4. The reaction system was irradiated with $\gamma$-rays from a cobalt-60 source at the dose rate of $1.1 \times 10^4$ roentgens per hour for 20 minutes at 50° C. in the absence of air. The total dose was $0.4 \times 10^4$ roentgens.

The formed non-grafted polymers was removed by extraction and the weight gain of the sample was 0.02540 g. That is to say, a graft-copolymerized fiber having 20.3% graft was obtained.

EXAMPLE 14

The same polyethylene terephthalate fiber as used in Example 1 (0.12720 g.) was immersed in 5 cc. of an aqueous emulsified graft copolymerization medium comprising 4-vinyl pyridine/methacrylic acid (100:17.9 by weight or 88:12 in molar ratio), water and emulsifier (10:90:0.5 by volume), the pH of which was 7.1.

The reaction system was irradiated with gamma radiation from a cobalt-60 source at the dose rate of $1.1 \times 10^4$ roentgens per hour for 25 minutes at 50° C. in the absence of air. The formed non-grafted polymers were removed by extraction, and the weight gain of the sample was 0.01921 g. That is to say, a graft-copolymerized fiber having 15.1% graft was obtained.

EXAMPLE 15

The same polyethylene terephthalate as used in Example 1 (0.10992 g.) was immersed in 5 cc. of an aqueous emulsified graft polymerization medium comprising 4- vinyl pyridine/methacrylic acid (100:17.9 by weight or 85:15 in molar ratio), water and emulsifier (10:90:0.5 by volume), the pH of which was 7.0.

The reaction system was irradiated with γ-rays from a cobalt-60 source at the dose rate of $1.1 \times 10^4$ roentgens per hour for 30 minutes at 50° C. in the absence of air. The total dose was $0.55 \times 10^4$ roentgens. After the formed non-graft polymer was removed by extraction, the weight gain of the sample was 0.01649 g. That is to say, a graft-copolymerized fiber having 15.0% graft was obtained.

EXAMPLE 16

The same polyethylene terephthalate fiber as used in Example 1 (0.14532 g.) was immersed in 5 cc. of an aqueous emulsified copolymerization medium comprising 4-vinyl pyridine/maleic acid (100:11.1 by weight or 92:8 in molar ratio), water and the emulsifier (10:90:0.5 by volume), the pH of which was 6.8.

The reaction system was irradiated with gamma radiation from a cobalt–60 source at the dose rate of $1.1 \times 10^4$ roentgens per hour for 10 minutes at 50° C. in the absence of air. The total dose was $0.2 \times 10^4$ roentgens. After the formed non-grafted polymer was removed by extraction, the weight gain of the sample was 0.02906 g. That is to say, a graft-copolymerized fiber having 20.0% graft was obtained.

EXAMPLE 17

The same polyethylene terephthalate fiber as used in Example 1 was immersed in 5 cc. of an aqueous emulsified copolymerization medium comprising 4-vinyl pyridine/ithaconic acid (100:11.1 by weight, 93:7 in molar ratio), water and the emulsifier (10:90:0.5 by volume), the pH of which was 6.8.

The reaction system was irradiated with gamma radiation from a cobalt–60 source at the dose rate of $1.1 \times 10^4$ roentgens per hour for 10 minutes at 50° C. in the absence of air. The total dose was $0.2 \times 10^4$ roentgens. After the formed non-graft polymers were removed by extraction, the weight gain of the sample was 0.01770 g. That is to say, graft-copolymerized fiber having 12.5% graft was obtained.

EXAMPLE 18

The same polyethylene terephthalate fiber as used in Example 1 was steeped in 5 cc. of an aqueous emulsified graft copolymerization medium comprising 4-vinyl pyridina/methacrylic acid (100:11.3 by weight or 100:11.3 by weight or 93:7 in molar ratio), water and emulsifier (10:90:0.5 by volume), the pH of which was 7.2.

After having been kept therein for 4 hours, the sample was taken out of the medium, and was irradiated with gamma radiation from a cobalt-60 source at the dose rate of $1.1 \times 10^4$ roentgens per hour for 1.5 hour at 50° C. in a nitrogen atmosphere.

After any formed non-graft polymers was removed by extraction, the weight gain of the sample was 0.02453 g. That is, a graft-copolymerized fiber having 19.1% graft was obtained.

The effect on the reaction rate of addition of a polymerizable unsaturated organic acid to the reaction system of the graft polymerization of 4-vinyl pyridine onto a polyester fiber material is summarized in the following table.

TABLE

Effect of the Ratio of 4-Vinyl Pyridine to Acid in Graft Polymerization of 4-Vinyl Pyridine and Various Unsaturated Polymerizable Acids onto Polyethylene Terephthalate

| Monomer | Composition of monomer mixture | | | pH | Graft, percent | Adhesion or agglutination of filaments |
|---|---|---|---|---|---|---|
| | 4-V.P./acid (by volume) | Parts of acid [1] (by weight) | 4-V.P./acid (mol. ratio) | | | |
| 4-vinyl pyridine (4-VP) | 100/0 | 0 | 100/0 | 8.8 | 47.6 | Adhesion. |
| 4-vinyl pyridine-acrylic acid | 95/5 | 5.5 | 96/4 | 7.5 | 84.3 | No adhesion. |
| | 90/10 | 11.6 | 91/9 | 7.2 | 155 | Do. |
| | 85/15 | 18.5 | 87/13 | 7.0 | 67 | Do. |
| | 80/20 | 26.3 | 82/18 | 6.8 | 12 | Do. |
| | 75/25 | 35.0 | 77/23 | 6.2 | 5.6 | Do. |
| 4-vinyl pyridine-methacrylic acid | 95/5 | 5.4 | 96/4 | 7.4 | 79.6 | Do. |
| | 90/10 | 11.3 | 93/7 | 7.3 | 136 | Do. |
| | 85/15 | 17.9 | 88/12 | 7.0 | 75.6 | Do. |
| | 80/20 | 25.4 | 85/15 | 6.8 | 30.1 | Do. |
| 4-vinyl pyridine-maleic acid | 90/10 | 11.1 | 92/8 | 6.8 | 93.7 | Do. |
| 4-vinyl pyridine-itaconic acid | 90/10 | 11.1 | 93/7 | 7.2 | 61.5 | Do. |

[1] Per 100 parts 4-vinyl pyridine.

The sample: a fluff of 5.5 denier x 18 filaments containing no tinatium oxide, having undergone extraction with carbon tetrachloride at 30° C. for 24 hours prior to graft polymerization.
Total monomer concentration: 10% by volume.
Emulsifier: Polyoxyethylene sorbitan monolaurate 0.5%
Dose rate: $1.1 \times 10^4$ roentgens per hour; total dose: $2.2 \times 10^4$ roentgens.
Reaction temp.: 50° C. (simultaneous irradiation).

What we claim is:

1. A process for manufacturing easily dyeable polyester fibers, comprising admixing ingredients comprising a major amount of 4-vinyl pyridine and a minor amount of a polymerizable unsaturated organic acid suspended in an aqueous medium, contacting said mixture with polyester fibers, exposing said fibers to irradiation of a high energy ionizing radiation in an amount of irradiation sufficient for a graft polymerization of at least about 1 percent when said irradiated fibers are contacted with said mixture, said major amount being sufficient to impart said percentage of graft copolymerization and said minor amount being sufficient substantially to neutralize said 4-vinyl pyridine to make the pH of the aqueous medium containing said 4-vinyl pyridine and said acid 6.0–7.5.

2. A process as defined in claim 1, in which said graft polymerization is carried out by means of simultaneous irradiation with a high energy ionizing radiation.

3. A process as defined in claim 1, in which said graft polymerization is carried out by means of pre-irradiation with a high energy ionizing radiation.

4. A process according to claim 1, in which said fiber comprises substantially a polyethylene phthalate, said acid is selected from the group consisting of acrylic acid, methacrylic, maleic acid, ithaconic acid, crotonic acid, propyolic acid, dichloromaleic acid, fumaric acid, vinyl sulfonic acid, and ethylene sulfonic acid, and in which said irradiaton is in a dose ranging from about $10^3$ to $10^7$ roentgens.

5. A process according to claim 4, in which said contacting is carried out with said mixture in an aqueous emulsified medium and in which said medium includes a surfactant.

6. A process according to claim 4, wherein the fiber comprises polyethylene terephthalate.

7. A process according to claim 1, wherein said mixture is contacted with the polyester fibers at a temperature ranging from about 20 degrees centigrade to about 100 degrees centigrade.

References Cited

UNITED STATES PATENTS 3,274,294  9/1966  Stanton et al. _____ 260—873
3,088,791  5/1963  Cline et al. _____ 204—159.17

MURRAY TILLMAN, Primary Examiner

R. B. TORER, Assistant Examiner

U.S. Cl. X.R.

8—115.5; 260—873